US008467629B2

(12) United States Patent
Dittert et al.

(10) Patent No.: US 8,467,629 B2
(45) Date of Patent: Jun. 18, 2013

(54) METHODS AND SYSTEMS FOR AUTOMATIC COLORING OF DIGITAL IMAGES

(75) Inventors: Leslie Dittert, Glendale, CA (US); James Perry, Irvine, CA (US); Steven Wiener, Topanga, CA (US); Michael Volland, Saugus, CA (US)

(73) Assignee: High Technology Video, Inc., Hollywood, CA (US)

( * ) Notice: Subject to any disclaimer, the term of this patent is extended or adjusted under 35 U.S.C. 154(b) by 136 days.

(21) Appl. No.: 13/206,427

(22) Filed: Aug. 9, 2011

(65) Prior Publication Data

US 2012/0063675 A1 Mar. 15, 2012

Related U.S. Application Data

(60) Provisional application No. 61/373,206, filed on Aug. 12, 2010.

(51) Int. Cl.
*G06K 9/32* (2006.01)
*G06K 9/00* (2006.01)

(52) U.S. Cl.
USPC .......................................... 382/294; 382/162

(58) Field of Classification Search
USPC ................. 382/162, 274–276, 294; 358/3.26, 358/3.27, 512, 518; 348/96, 97
See application file for complete search history.

(56) References Cited

U.S. PATENT DOCUMENTS

| 4,641,244 A * | 2/1987 | Wilson et al. ................. 700/160 |
| 5,251,271 A * | 10/1993 | Fling ............................. 382/162 |
| 5,414,782 A | 5/1995 | Carasso |
| 5,508,761 A | 4/1996 | Saito et al. |
| 5,550,591 A | 8/1996 | Rim et al. |
| 6,016,182 A | 1/2000 | Ohashi et al. |
| 6,618,512 B1 | 9/2003 | Yamaguchi |
| 6,775,419 B2 | 8/2004 | Maeda et al. |
| 7,012,642 B1 | 3/2006 | Zell |
| 7,092,584 B2 * | 8/2006 | Perlmutter et al. ........... 382/294 |
| 7,177,050 B2 | 2/2007 | Mead |
| 7,218,795 B2 | 5/2007 | Trifonov et al. |
| 7,257,270 B2 | 8/2007 | Yamaguchi |
| 7,408,569 B1 | 8/2008 | Yamaguchi |
| 7,486,842 B2 * | 2/2009 | Gasparri et al. .............. 382/294 |
| 7,769,244 B2 | 8/2010 | Kozlov et al. |
| 7,933,463 B2 | 4/2011 | Lewis et al. |
| 2009/0304243 A1 * | 12/2009 | Mertz et al. ................... 382/128 |
| 2012/0063675 A1 * | 3/2012 | Dittert et al. .................. 382/162 |

* cited by examiner

*Primary Examiner* — Amir Alavi

(74) *Attorney, Agent, or Firm* — Knobbe, Martens, Olson & Bear LLP

(57) ABSTRACT

Methods and systems for coloring media are described. A first sequence of images at a first resolution is received, wherein the first sequence of images includes images with color information. A second sequence of images is received. Optionally, image registration is performed for a plurality of images in the first sequence with respect to the second sequence and/or for a plurality of images in the second sequence with respect to the first sequence. A color analysis is performed using (optionally aligned) images from the first sequence of images and the second sequence of images, and the results are used to color the second sequence of images.

30 Claims, 14 Drawing Sheets

| FIG. 6C₁ | FIG. 6C₂ |

FIG. 6C

| FIG. 6B₁ | FIG. 6B₂ |

FIG. 6B

| FIG. 6A₁ | FIG. 6A₂ |

FIG. 6A

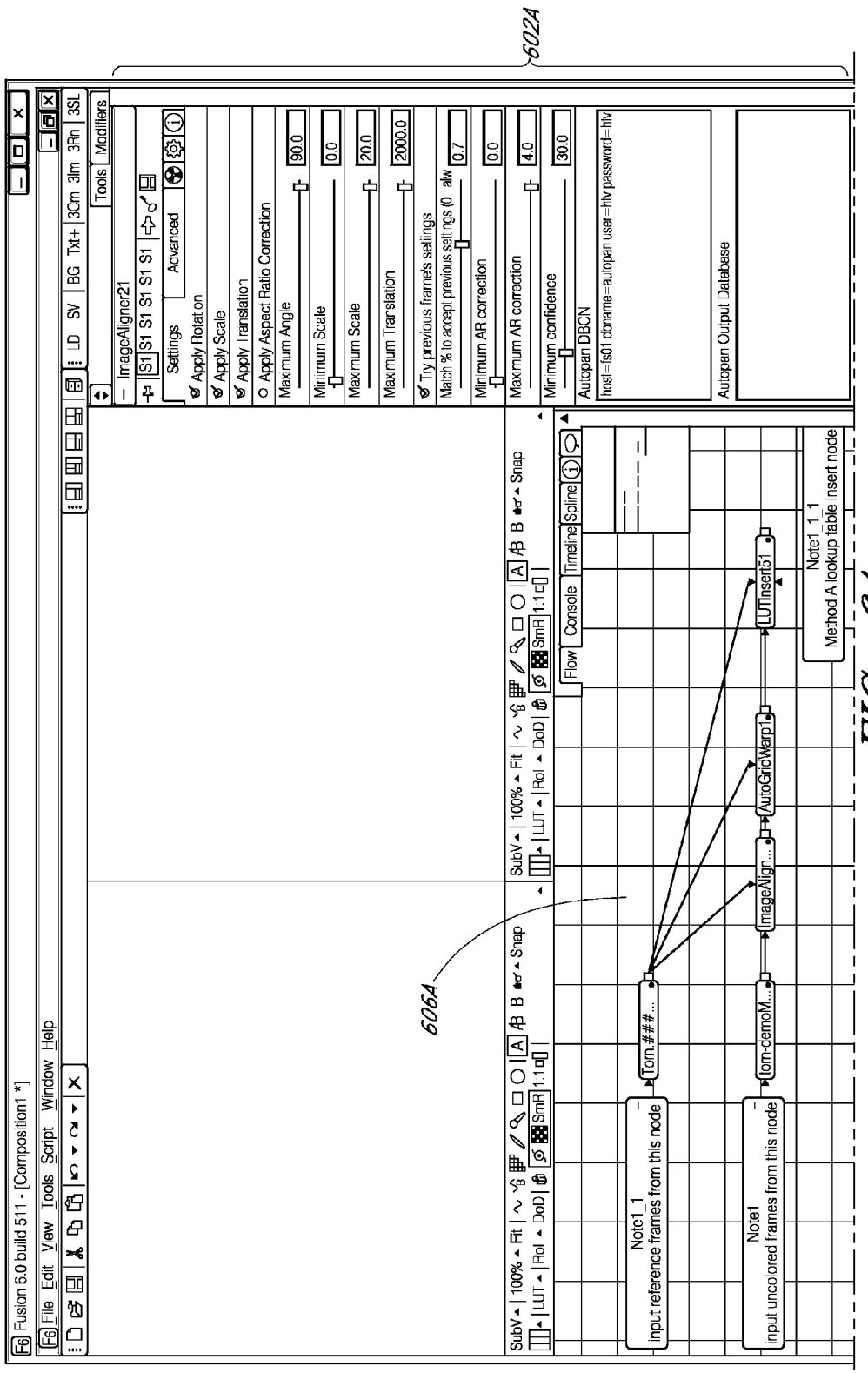
FIG. 6A₁

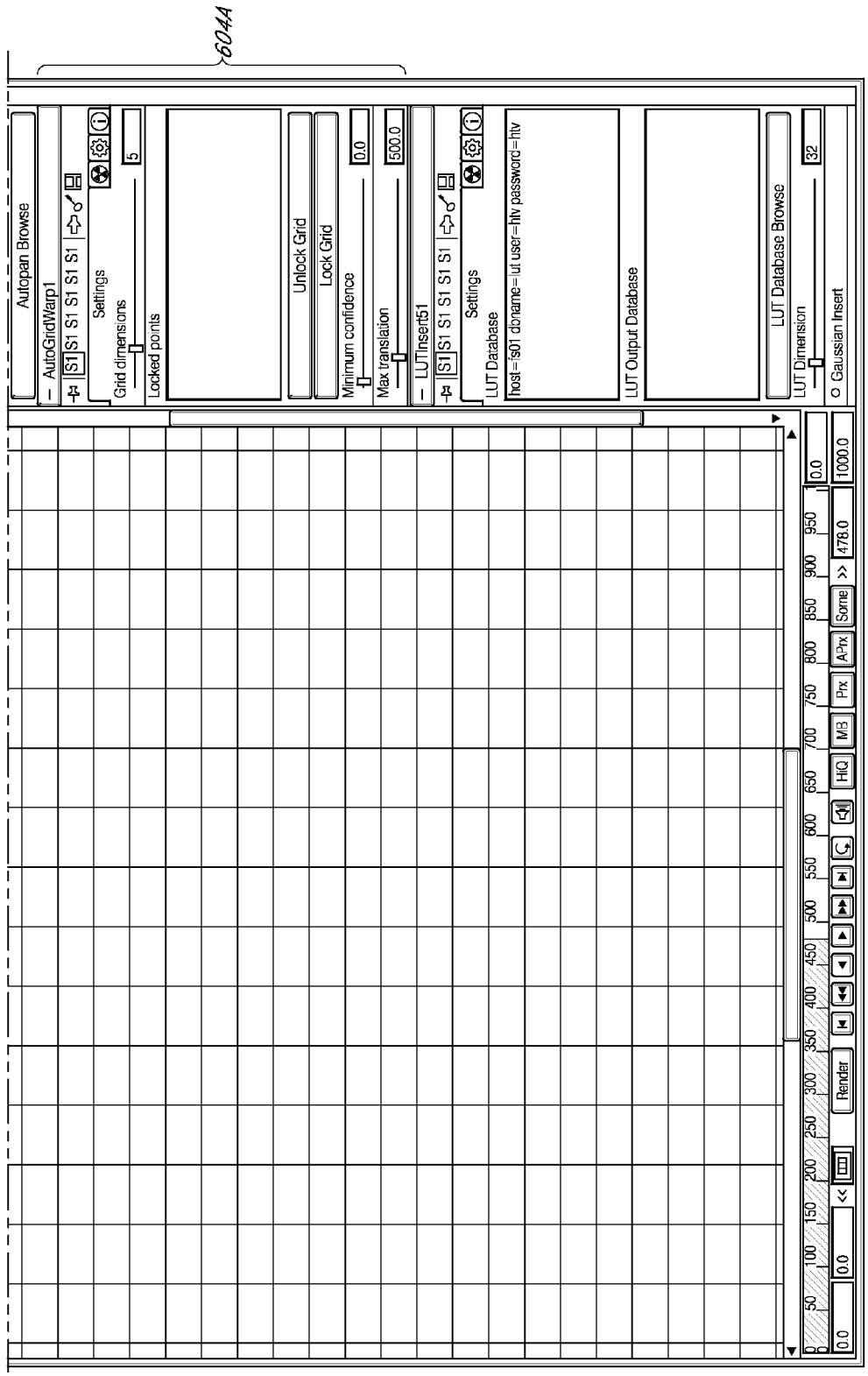
FIG. 6A2

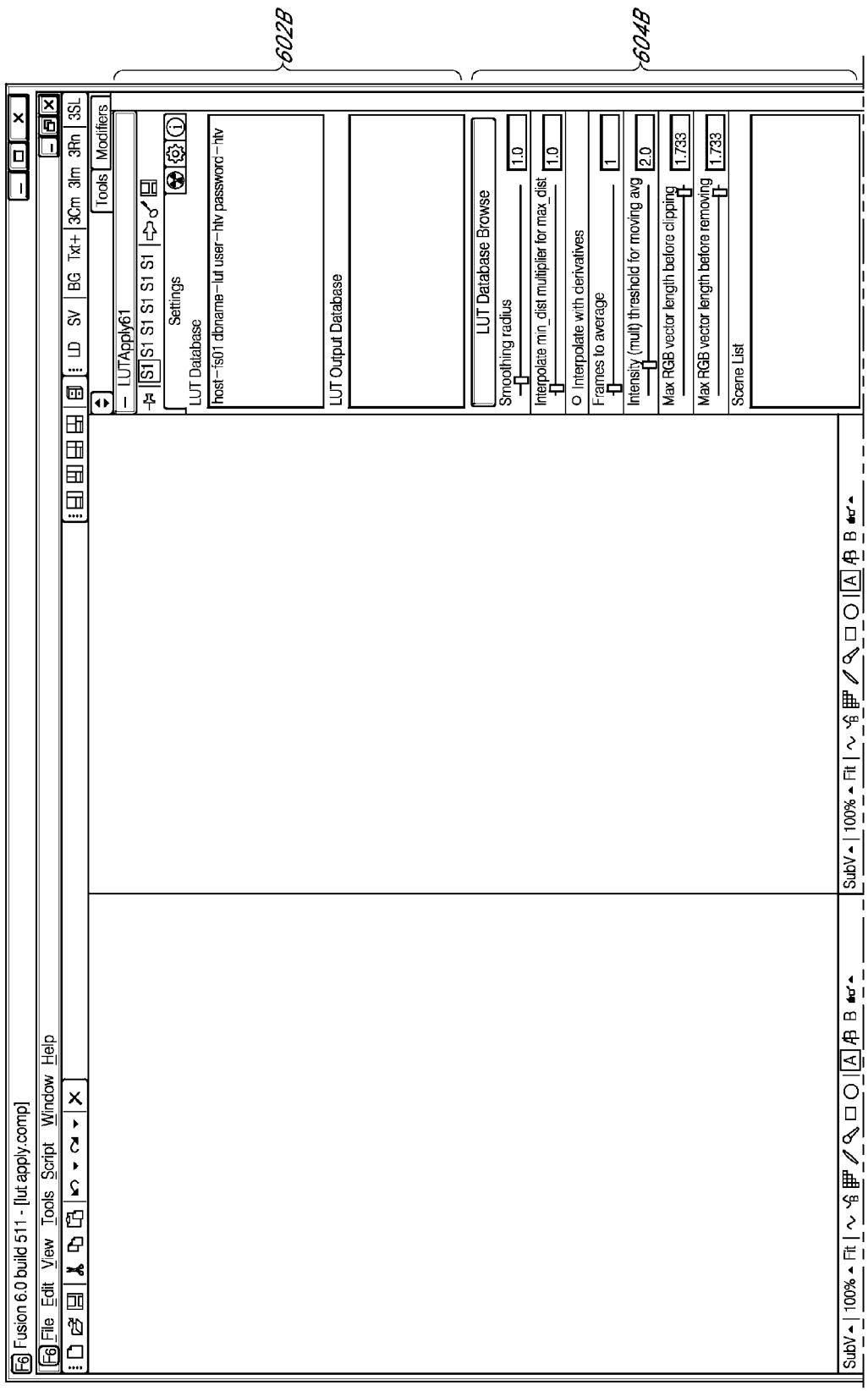
FIG. 6B₁

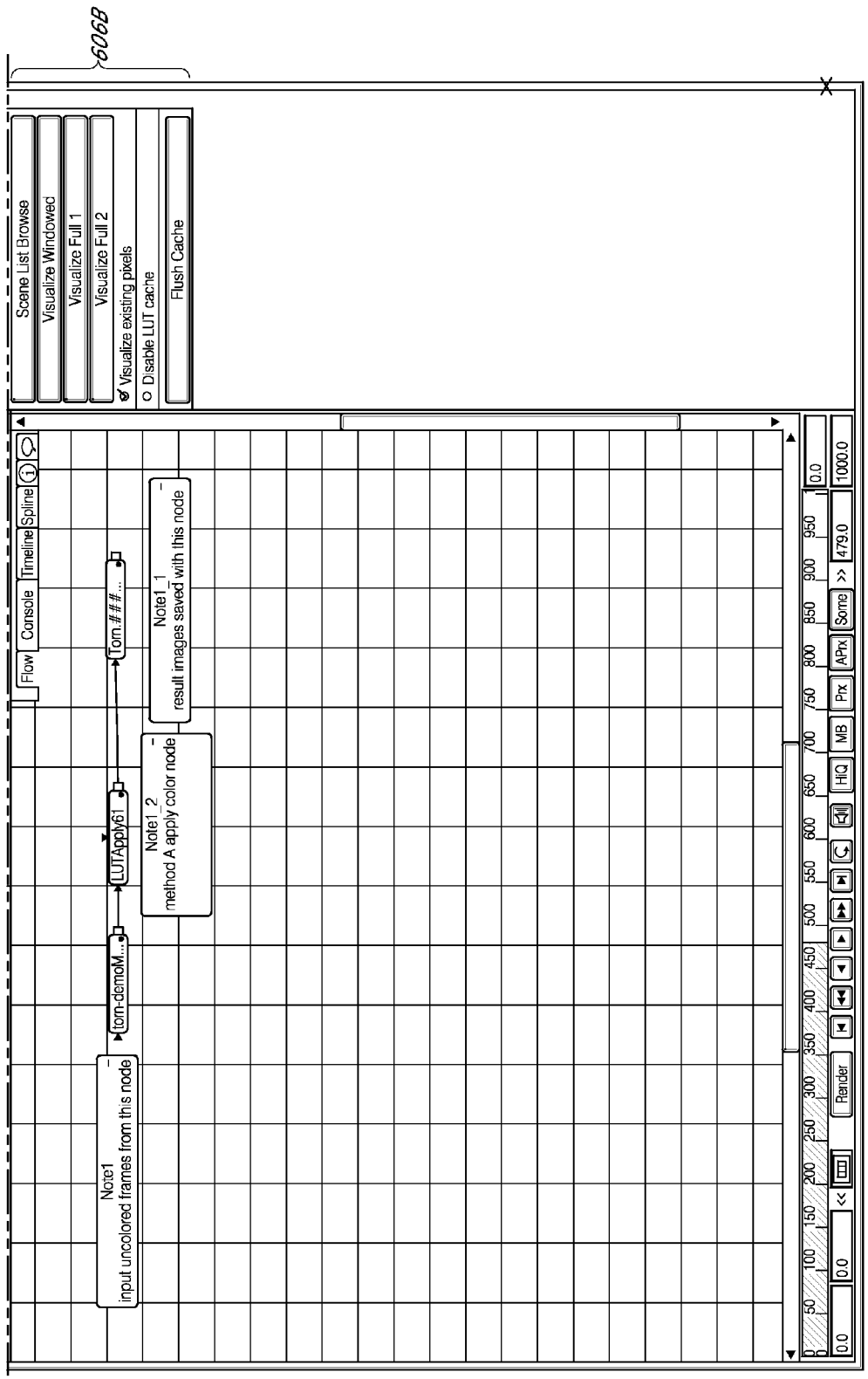
FIG. 6B2

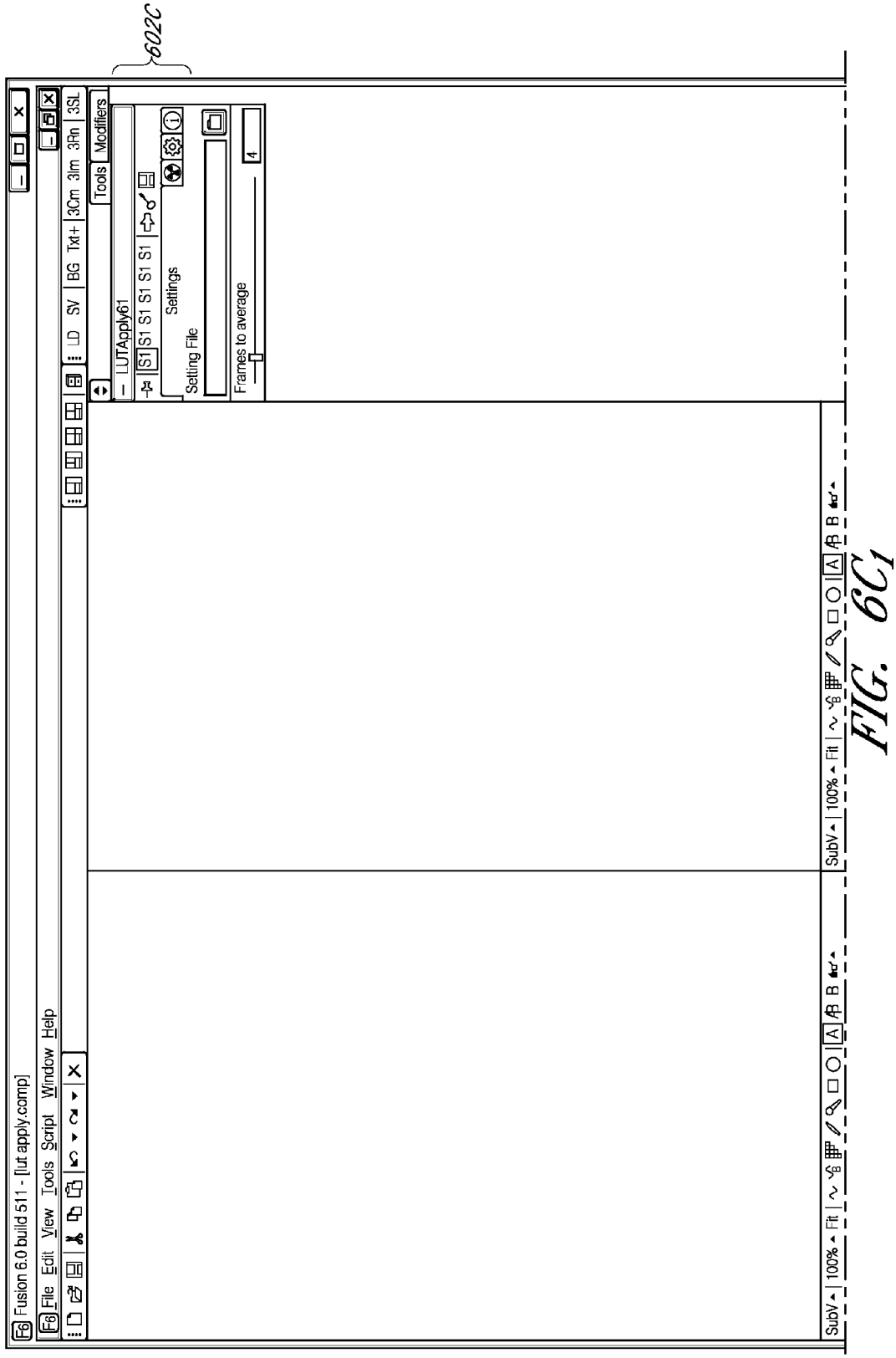
FIG. 6C₁

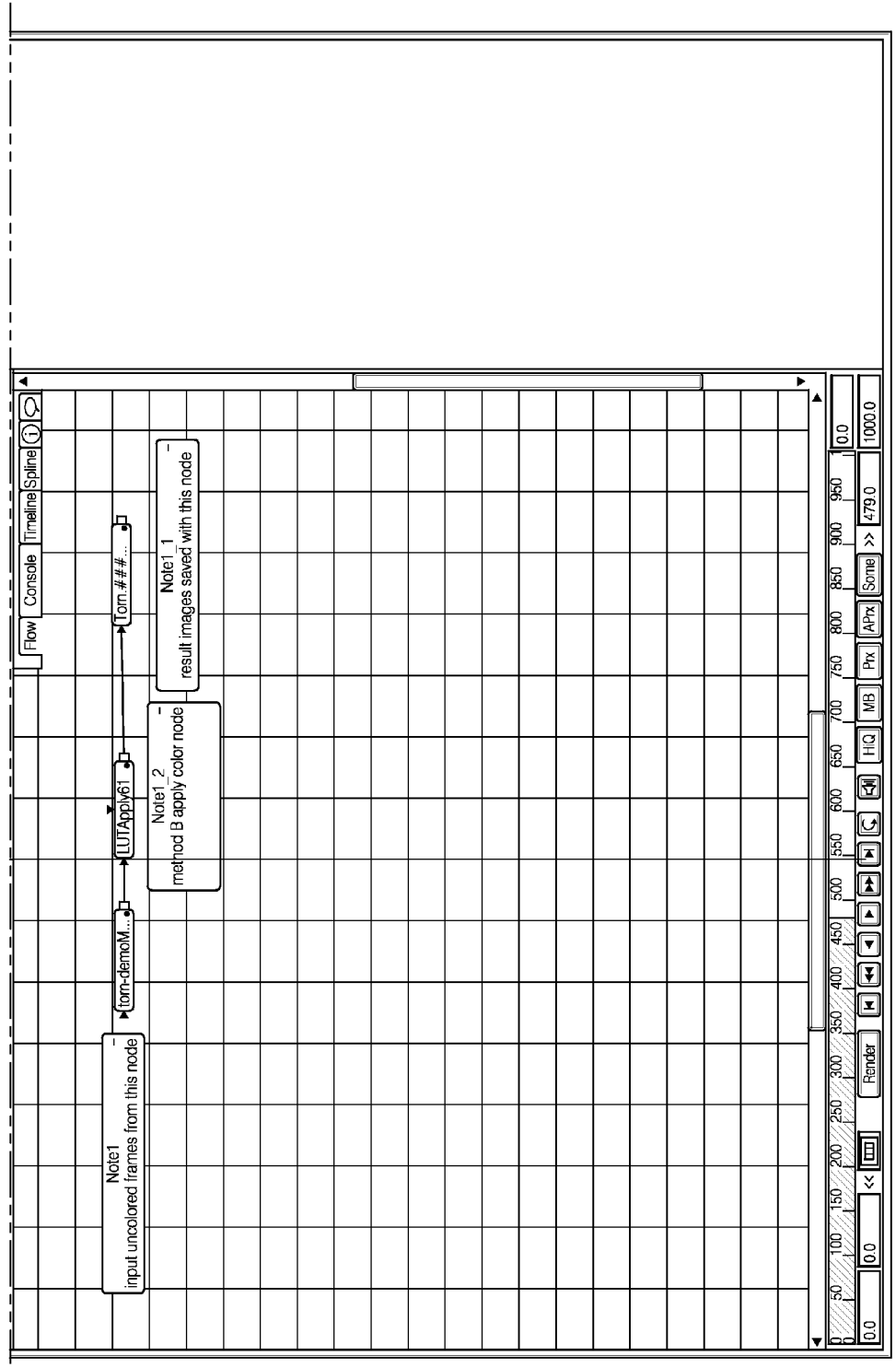
FIG. 6C2

METHODS AND SYSTEMS FOR AUTOMATIC COLORING OF DIGITAL IMAGES

CROSS-REFERENCE TO RELATED APPLICATIONS

The present application claims priority under 35 U.S.C. §119(e) from U.S. Patent Application Ser. No. 61/373206, filed Aug. 12, 2010, the content of which is incorporated herein by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is generally related to coloring, and in particular, to methods and systems for coloring digital media.

2. Description of the Related Art

As technology advances, media, such as video media, can be displayed with ever greater resolution using display devices, such as LCD or plasma high definition televisions or monitors. However, a large percentage of video media may have been recorded at a lower resolution or using non-digital techniques. These legacy video media products (e.g., movies, television shows, etc.) were typically color corrected at the "old" relatively low resolution (e.g., in "standard definition," such as 720×486 pixels in United States format or 720×576 pixels in European format). However, studios and the like often want to release the legacy video media products in a higher quality, higher resolution format (e.g., a high definition format, such as at 1280×720 or 1920×1080 pixels), while retaining the same color look as the lower resolution legacy version.

Certain conventional approaches utilize a time consuming, expensive, and sometimes inaccurate manual color grading process to color the new, higher resolution version of the media product so that it looks like the previously color approved media product.

Other conventional approaches have utilized an automated color correction process. However, disadvantageously, certain of these automated coloring processes require that the higher resolution and lower resolution digital versions be from the exact same digital source so that images in the different versions are in perfect alignment. Thus, such conventional automated processes do not permit the higher resolution version to have a different cropping, zooming, or panning than the lower resolution, original version.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present invention is generally related to coloring, and in particular, to methods and systems for coloring digital media (which may be a digitized form of analog media). Certain embodiments take at least two versions of a media item (e.g., a movie, a television show, or game, that include image sequences/frames) having different resolutions. A first version (sometimes referred to herein as the reference version) may already have been satisfactorily color corrected and may be at a relatively lower resolution with respect to a second version (sometimes referred to herein as the source version). The second version is not yet color matched with respect to the reference media. The two versions are digitized if they are not already in a digital format. Optionally, the two versions are of the same media item (e.g., of the same movie, television show, or game), but may have different characteristics, in addition to different coloring and resolution. For example, one of the two versions may include framing and scenes with different panning, cropping, zooming than the other of the two versions.

Optionally, neither version that will be used in the coloring process is derived from the other version, although both versions may be derived from a common source (e.g., a master version) or from different sources (e.g., one version is from a film negative, while the other version is from a film positive; the different versions are from different prints, etc.). Optionally, one version is derived directly from the other version.

An image alignment process is optionally performed. For example, the media streams of the two versions may be aligned and registered with each other so that the image details in a given image/frame are in substantially the same location in each stream (e.g., within a certain tolerance). Thus, the post-alignment image streams look like each other, except that, optionally the source (e.g., higher resolution) version is still in the default colored state (or optionally is not colored at all), and the reference version has the finished and desired color from the legacy reference source.

A color analysis is optionally performed using hardware and/or software. For example, the color analysis may input the image aligned reference and source streams and produce an output of the color modifications needed to color the source media to have sufficiently the same coloring as the coloring of the reference media. The output may be stored in a data store.

Optionally, after or during the performance of the image alignment process, a difference detector (which may include software and/or hardware) detects non-correctable (or not satisfactory correctable) image alignment errors or differences in the reference and source media streams. For example, the difference detector may optionally perform image subtraction to identify image areas that may not overlap perfectly or sufficiently. These areas are optionally excluded from pixel to pixel comparisons that are optionally used, in an example embodiment, in performing the color correction to achieve a satisfactory match (e.g., the best overall color match) with respect to the reference version. Optionally, these areas of non-alignment (which may typically be small), are ignored by the subsequent color adjustments so as to reduce errors in performing the color analyses process. The color analysis process may use one or a plurality of methods in performing coloring of the source media so that the source media has the same coloring at the same locations/pixels, as the reference media.

Using results of the color analysis process, the coloring of the reference media is replicated to the source media so that the coloring of the source media substantially matches the reference media. Optionally, image areas that may have been cropped off (or otherwise muted) in order to match the framing of the reference media are also colored to match with the general look of the color of the image and/or to match the coloring of areas adjacent to the cropped off or muted areas.

The colored output of the new high resolution media can be optionally cropped and/or framed to match or closely match the original reference media. Optionally, cropping or panning or zooming is performed into the source media to match these movements in the reference media. Optionally, simultaneous outputs of full frame and cropped/panned/zoomed source media can also be generated as output from the system.

Thus, for example, the color information of an old, relatively low resolution version of a movie, may be used as an input in coloring a relatively higher resolution version of the movie, efficiently, accurately, and at relatively lower cost.

In an example embodiment, a method of coloring an image sequence comprises receiving a first sequence of images at a first resolution, wherein the first sequence of images includes images with color information; receiving a second sequence of images; optionally performing image registration for a plurality of images in the first sequence with respect to the second sequence and/or for a plurality of images in the second sequence with respect to the first sequence; performing a color analysis using (optionally aligned) images from the first sequence of images and the second sequence of images, using results of the color analysis to color the second sequence of images, wherein the second sequence of images is colored to have substantially the same coloring as the first sequence of images.

Further, an example method is provided for coloring an image sequence, the method comprising: receiving at an apparatus including a computing device: a first sequence of images at a first resolution, wherein the first sequence of images includes images with color information; a second sequence of images; performing image registration for a plurality of images in the first sequence with respect to the second sequence and/or for a plurality of images in the second sequence with respect to the first sequence; identifying at least a portion of one image in the second sequence that is not registered with respect to at least one image in the first sequence; performing a color analysis using aligned images from the first sequence of images and the second sequence of images, wherein the at least portion of one image in the second sequence that is not registered with respect to at least one image in the first sequence is not used in performing the color analysis; and using results of the color analysis to color the second sequence of images, wherein the second sequence of images is colored to have substantially the same coloring as the first sequence of images.

Further, an example system is provided, including at least one computing device, configured to perform operations comprising: receiving: a first sequence of images at a first resolution, wherein the first sequence of images includes images with color information; a second sequence of images; performing image registration for a plurality of images in the first sequence with respect to the second sequence and/or for a plurality of images in the second sequence with respect to the first sequence; identifying at least a portion of one image in the second sequence that is not registered with respect to at least one image in the first sequence is not used in performing the color analysis; and using results of the color analysis to color the second sequence of images, wherein the second sequence of images is colored to have substantially the same coloring as the first sequence of images.

Further, an example method is provided for coloring an image sequence, the method comprising: receiving at an apparatus including a computing device: a first sequence of images at a first resolution, wherein the first sequence of images includes images with color information; a second sequence of images; performing image registration for a plurality of images in the first sequence with respect to the second sequence and/or for a plurality of images in the second sequence with respect to the first sequence; performing a color analysis using aligned images from the first sequence of images and the second sequence of images; and using results of the color analysis to color the second sequence of images, wherein the second sequence of images is colored to have substantially the same coloring as the first sequence of images.

Further, an example system is provided, including at least one computing device, configured to perform operations comprising: receiving: a first sequence of images at a first resolution, wherein the first sequence of images includes images with color information; a second sequence of images; performing image registration for a plurality of images in the first sequence with respect to the second sequence and/or for a plurality of images in the second sequence with respect to the first sequence; performing a color analysis using aligned images from the first sequence of images and the second sequence of images; and using results of the color analysis to color the second sequence of images, wherein the second sequence of images is colored to have substantially the same coloring as the first sequence of images.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIGS. 6A-D illustrate example user interfaces.

DETAILED DESCRIPTION OF PREFERRED EMBODIMENTS

Described below are example embodiments of methods and systems for coloring media, such as movies, television recordings, documentaries, or other media. The embodiments may be implemented via hardware, software stored on media, or a combination of hardware and software. For example, certain embodiments may include software/program instructions stored on tangible, non-transitory computer-readable medium (e.g., magnetic memory/discs, optical memory/ discs, RAM, ROM, FLASH memory, other semiconductor memory, etc.), accessible by one or more computing devices configured to execute the software. For example, the computing device may be in the form of one or more server(s), general purpose computers, graphic workstations, or other computing device(s). The computing devices may include one or more processors, wired and/or wireless network interfaces (e.g., cellular, WiFi, Bluetooth, T1, DSL, cable, optical, or other interface(s) which may be coupled to the Internet or other network), content databases, user preference databases, etc.

By way of example, a given computing device may optionally include user interface devices, such as some or all of the following: one or more displays, keyboards, touch screens, speakers, microphones, mice, track balls, touch pads, printers, etc. The computing device may optionally include a media read and/or write device, such as a CD, DVD, Blu-ray, tape, magnetic disc, semiconductor memory, or other optical, magnetic, and/or solid state media device.

It should be noted that while certain embodiments described herein may refer to the use of an RGB (red, green, blue) color space, other color spaces can be used as well. For example, CMYG (cyan, magenta, yellow, black), YUV (luminance (Y) and color difference (U, V) components, YCbCr, YCCK, and/or other color spaces can be used.

Figure 1:
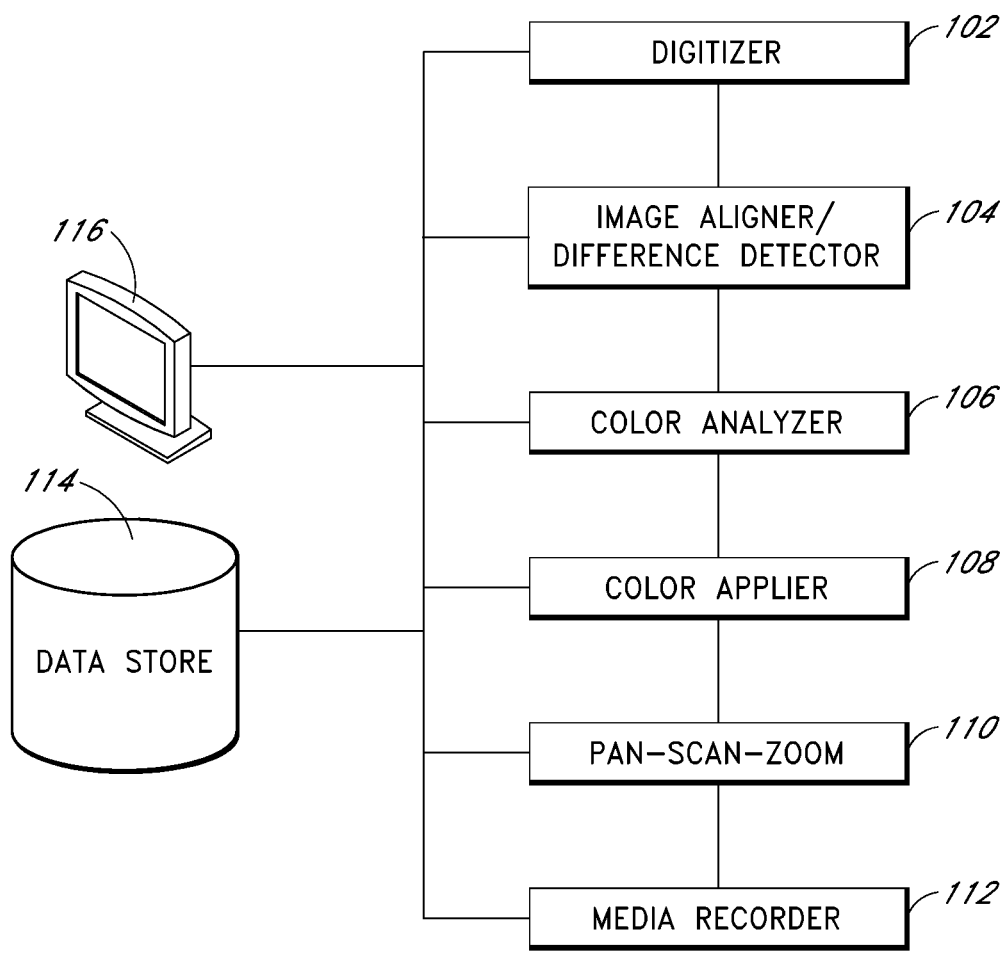
FIG. 1 illustrates an example embodiment of an automatic coloring system which may be utilized with processes described herein.

FIG. 1 illustrates an example embodiment of an automatic coloring system which may be utilized with processes described herein, although other embodiments may include different, fewer or additional components. Further, it is understood that the various devices may be combined into fewer devices or divided into additional devices.

The various illustrated devices may include hardware and/ or software stored on non-transitory media that is executable by hardware. For example, as similarly discussed above, the hardware may include a general purpose processor and/or dedicated image processing hardware, as well as associated software/firmware stored in memory that is executed by the general purpose or dedicated processors. The example system includes a digitizer 102, which may be used to digitize media, including image and/or sound media. For example, the digitizer 102 may be configured to digitize film-based media, analog video tape media, photographs, and/or other media at various resolutions. The digitizer may be configured to digitize colored media.

An image aligner device 104, which may be implemented using hardware (e.g., including a processor) and/or software stored in memory, is used to perform image registration and alignment with respect to two or more media sources (e.g., first and second media sources received from the digitizer 102).

By way of illustration, the media sources may include media digitized via digitizer 102. As discussed in greater detail elsewhere herein, the first media may be a previously color corrected media that is to be used as a reference source. A second media, which may be a source media that is to be colored or color corrected using the coloring information from the first media, may optionally be of higher resolution than the first media.

The media sources may be from different digital sources (although of the same presentation/movie/television show) and so may not be perfectly aligned or registered. For example, the media sources may differ in coloring, panning, scanning, and/or zooming. Thus, in certain embodiments, the received second media is not derived from the first media, even though the digitized first media is to be used as a reference media in coloring the second media.

However, optionally, the second media is derived from the first media prior to the alignment and color application processes. Optionally, the first and second media are separately derived from a master media. Optionally the first and second media are from respective different sources. For example, the first media may be from a film negative, while the second media may be from a film positive. By way of further example, the first media may be from a first print, while the second media may be from a second print.

The source and reference media may include a single image or a sequence of images (e.g., such as in a video or movie). The images in the source media and/or the reference media may include one or more types of distortions, such as pincushion, barrel, drift, and/or warping distortion. These distortions may have been introduced or exacerbated by creating the reference and/or source media by filming a CRT or other display displaying the content being reproduced. As such, it may be desirable to remove such distortions.

Optionally, the image aligner device 104 may utilize image mesh warping and/or other spatial image displacement techniques to reduce or remove such distortions, and for performing the alignment and registration process between the first, reference media and the second, source media (which is to be colored using coloring information from the first media). For example, a spatial transformation may be performed that modifies the spatial relationship between selected pixels in an image with distortions to new locations in an output image to thereby remove or reduce such distortions.

In particular, initially, one or more corrective warps may optionally be separately applied to images in the reference image and source image. For example, one or more corrective warps may be applied to correct for pincushion, barrel, drift, warp and/or other distortions.

Then, an alignment process may be performed using one or more spatial image displacement techniques with respect to the two media sources. Optionally, image mesh warping is employed that utilizes a mesh-warping algorithm that relates features with non-uniform mesh in a reference image (e.g., the first, reference media at a relatively lower resolution) and corresponding source image (e.g., the second, source media, at a relatively higher resolution). For example, a pixel-to-pixel spatial coordinate transformation map may be used for warping coordinates of the reference image to generate a registered source image, which is then stored in memory and/or output for display. By way of illustration, if corresponding frames in the source and reference images include a flower (where the reference image has the flower colored red), an alignment process is used to ensure that the flower images line up prior to applying color from the reference image to the source image.

Optionally, in addition or instead, other spatial image displacement techniques are used for aligning and registering images. For example, images from the reference and source image may be aligned by applying spatially varying displacement shifts to one or both images in one or more directions (e.g., in a vertical direction and/or in a horizontal direction).

Optionally, the alignment process may be performed in multiple stages. For example, alignment may first be performed on a macro level to cure relatively large geometric distortions (e.g., by performing x-y displacements and/or zooming of an image or portions thereof). Then, finer alignment may be performed at each mesh grid point (or a subset thereof). The alignment process may generate pan, zoom, and/or displacement correction information for a given image or frame, such as "zoom in 20% and move pixels to the left 10%". The correction information may then be stored in a database.

The image aligner 104 optionally includes a difference detector configured to identify image areas (e.g., using image subtraction) in the first, reference media and the second source media that may not overlap and or not sufficiently overlap. By way of illustration, this may occur if the source media is cropped differently then the reference media, as there will be portions of at least one image in the source media that does not fully overlap the corresponding image in the reference media.

The difference detector may, for example, subtract an image of the source media from a corresponding image of the reference media (or visa versa). Where non-zero value occurs (or a non-zero value above a certain threshold), the images are not aligned. Optionally, some or all of the non-aligned areas in the default colored second image may be excluded from the color analysis process described elsewhere herein (e.g., excluded from pixel to pixel comparisons used in creating overall color correction) to avoid inadvertently introducing errors that may occur from comparing the coloring of non-aligned media.

Optionally, the non-aligned areas that are to be excluded may be somewhat exaggerated or thickened to further ensure that information from the non-aligned areas are not inadvertently used in performing the color analysis. For example, if a non-aligned area is three pixels wide, the portion excluded from the color analysis may be that three-pixel wide region, plus an additional two pixels on either side. Of course the non-aligned areas may be expanded further or less. The exclusion may be performed by muting the excluded portions of the reference media (e.g., reducing the luminance or brightness) during the color comparisons discussed below or by otherwise storing an indication regarding which areas are to be excluded.

A color analyzer 106 receives two or more media sources, such as the reference and source media discussed above— post alignment, and produces information the color modifications needed to color the source media so that the source media has the same or sufficiently the same coloring as the reference media. Optionally, the color analyzer 106 utilizes lower resolution versions of the first and source media in performing the analysis. For example, the reference media may be at 720×486 pixels per frame, and the source media may be at 1280×720 or 1920×1080 pixels per frame. However, the color analyzer, or other process, may reduce the number of pixels (e.g., to 256×256 pixels) to reduce the computational load on the system when performing the color analysis process. Optionally, the lower resolution versions of the source media and the reference media will be configured to have the same aspect ratio.

Such a reduction in the number of pixels will typically have a relatively minor impact on the color analysis and color process. For example, as discussed in greater detail below, the reduction may be performed by averaging the color values of two or more pixels to find a representative color value and replacing some or all of the pixels used in the averaging process for a given group of pixels with one pixel having the average value. Other filtering processes may be used.

Optionally, the color analyzer 106 utilizes multiple color analysis techniques, and determines from the outputs of the multiple color analysis techniques which technique provides the best or otherwise satisfactory result for use in applying color to the source media, such as by the color applier device 108 discussed below. Optionally, the results of two or more techniques may be utilized in performing coloring of the source media.

Optionally, using a first technique, a lookup table (LUT) is used to perform color space transformation, optionally with interpolation. The pixels in both images contribute to filling the lookup table. For example, in an illustrative embodiment, RGB values in the reference frame determine the location in a color cube LUT, as x=R, y=G, z=B. The source color is then inserted into the color cube LUT. In this example, the color cube LUT is of a fixed dimension (e.g., 48×48×48 values, or other dimension). Therefore, the incoming color values are 'weighted' into the LUT by interpolating the values into the nearest neighbor LUT vertices. The lookup table (LUT) may be used to map color and intensity values from the source images to the reference images. For example, the lookup table may be a three dimensional lookup table that corresponds to a 3D lattice of output values, where a given axis corresponds to one of the three RGB input color components, and so where an input color defines a point inside the table. The color space transformation is used to correlate the source and destination color values in the lattice points of the table, where non-lattice points are interpolated by using the nearest lattice points. Thus, in this process, the color of two aligned images are optionally compared on a pixel by pixel basis to generate to-and-from color information for RGB triplets.

In particular, in an example embodiment, the source space is partitioned. The partitioned source space is populated with sample points. Optionally, the lookup table is generated using equal (or optionally, unequal) step sampling along a given axis of the source space to provide $(n-1)^3$ cubes and $n^3$ lattice points, where n is the number of levels. Non-lattice points may be interpolated by using the nearest lattice points. For example, the interpolation may be performed using geometrical interpolation (e.g., bilinear, trilinear, prism, pyramid, and/or tetrahedral interpolation) for color values that are not lying directly on a color vertex.

By way of illustration, the color table cube may have dimension of 4×4×4 with evenly spaced vertices, although other dimensions may be used as well. In an example color cube, RGB values are at three corners, with red at (1,0,0), green at (0,1,0), and blue at (0, 0, 1), with cyan at (0, 1, 1), magenta at (1, 0, 1) yellow at (1, 1, 0), black at the origin (0, 0, 0), and with white at the corner farthest from the origin (1, 1, 1). Other color spaces can be used as well or instead (e.g., CMYG (cyan, magenta, yellow, black), YUV (luminance (Y) and color difference (U, V) components, YCbCr, YCCK, etc.).

For example, the color analyzer 106 is optionally configured to insert color values of each pixel (or at least a portion of the pixels) of the aligned images of the reference media and the source media into the lookup table. This process is performed to indicate where the corresponding color (e.g., a RGB color triple) should be changed to achieve the desired reference color (e.g., on a final digital or analog "print"). Thus, the 3D lookup table may be used to transform the colors of the source media into a more desirable version of the source media, with color substantially similar to that of the reference media.

Optionally, in addition or instead, the color analyzer 106 is configured to utilize a second technique, where a set of color controls is used to mathematically adjust the color of a given pixel. By way of example, these color controls can include controls for adjusting brightness, contrast, saturation, gamma, hue, tint, and/or other color altering settings. Correction formulas for the foregoing are commonly available. Optionally, lookup tables, such as a gamma-correction lookup table, may be used to perform the correction for one or more of the image color characteristics.

The color analyzer 106 may vary the settings of one or more color controls for these multiple formulas in iterated steps, keeping score at a given step of the color accuracy of the result with respect to matching the desired reference color and, optionally, contrast. For example, after a given adjustment of one or more controls to adjust the color or luminosity of the source image, the adjusted source image can be subtracted from the reference image. If the colors perfectly match, the image resulting from the subtraction process should be black.

By way of example, the correction may optionally be scored by adding up the number of non-black pixels to thereby generate a color accuracy score, where, in this example embodiment, a lower score represents a better color match. Optionally, after completing a certain number of iterations, where the score for each or some of the iterations are stored, the analyzer 106 identifies and stores in memory at least one set of parameters (e.g., the best/most satisfactory set of parameters/formula settings to produce the color result that best or most satisfactorily matches the source media with the reference media as determined by the scores).

The color analyzer 106 optionally includes a selector that selects the result from the different techniques that provides the most satisfactory/best color match.

The color applier device 108 accesses the results of color analyzer 106 and uses the results to color the source media. Thus, the frames and pixels of the source media (which may have the default coloring) are colored to have substantially the same coloring as the reference media. The coloring is optionally performed by the color applier device 108 on a frame to frame and pixel to pixel basis to substantially replicate the coloring of the reference media in the source media (although, optionally, certain frames and pixels may be excluded). Optionally, results from both the first color analysis technique, utilizing the color look-up table, and the second color analysis technique, utilizing color correction formulas/controls, are used in applying color to the second (source) media.

For example, it has been determined that in certain instances that first technique provides more accurate correction when the amount of needed color adjustment or correction is relatively small, while the second technique may provide better results were the needed color adjustment or correction is relatively large. Thus, optionally, the second technique may be applied first to process the large differences in color between the reference image and the source image, and then the first technique may be applied to further refine the coloring of the source media. When the first technique is utilized, the 3D lookup table is applied. When the second technique is applied, the most satisfactory (or other) mathematical "knob positions" (e.g., corresponding to a mathematical formula, or constants or variables therein) for the color controls are accessed from memory and utilized in performing the color application.

Optionally, the color applier device 108 is configured to color image areas of the source media that may have been cropped off or otherwise excluded in order to match the framing of the first, reference media so as to match the general look of the image color. For example, the excluded areas may be colored using the same coloring as an adjacent, colored area or an average of the coloring of two or more adjacent pixels. The colored output of the colored source media is optionally cropped and/or framed to match the first, reference media.

A pan-scan-zoom device 110 optionally generates a version of the colored source media that is panned, scanned, and/or zoomed, as desired. For example, zooming may be performed using interpolation to generate values for inserted pixels. In particular, the interpolation process may be used to estimate an image value at a location in between image pixels where the additional pixels are to be added. Interpolation may be performed using bilinear, trilinear, prism, pyramid, and/or tetrahedral interpolation.

For example, the value for an interpolated pixel may be determined by finding the point in the input image that corresponds to a pixel in the output image and then calculating the value of the output pixel by computing a weighted average of a respective set of pixels in the neighborhood of the point, where the weightings may be based on the distance each pixel is from the point.

With respect to interpolation techniques described herein, optionally, the user can specify interpolation related items, the number of frames to average in performing the interpolation, the intensity multiplier for the moving average, a maximum RGB vector length before clipping (used in determining when a vector length is such that the vector length is likely in error and should be clipped), and/or a maximum RGB vector length before removing (used in determining when a vector length is such that the vector length is likely in significant error and should be removed to eliminate bad data).

A data store 114 may be utilized by one or more of the devices discussed above to store data for other devices and/or to access data from other devices. For example, the digitized media may be stored by the digitizer 102 in the data store 114, and the image aligner 104 may access the digitized media from the data store 114 in order to perform image alignment/registration. The image aligner 104 may in turn store the aligned images and/or information (e.g., displacement information) on how to adjust the images so that they are aligned in the data store 114. The color analyzer 108 may store the 3D lookup table(s) and color correction formulas/knob settings in the data store 114. The pant-zoom-scan module 110 may store the panned/scanned/zoomed images and/or information on how the panning/scanning/zooming is to be performed. A display 116 is provided via which the system can display data produced by devices and/or other data. The data store 114 may organize or access the stored data using a database.

Thus, as described above, the automatic coloring system is optionally configured to perform color matching with respect to at least two media items that may be from different digital sources and that are not perfectly aligned (e.g., that differ in coloring, resolution, panning, scanning, and/or zooming).

Figure 2:
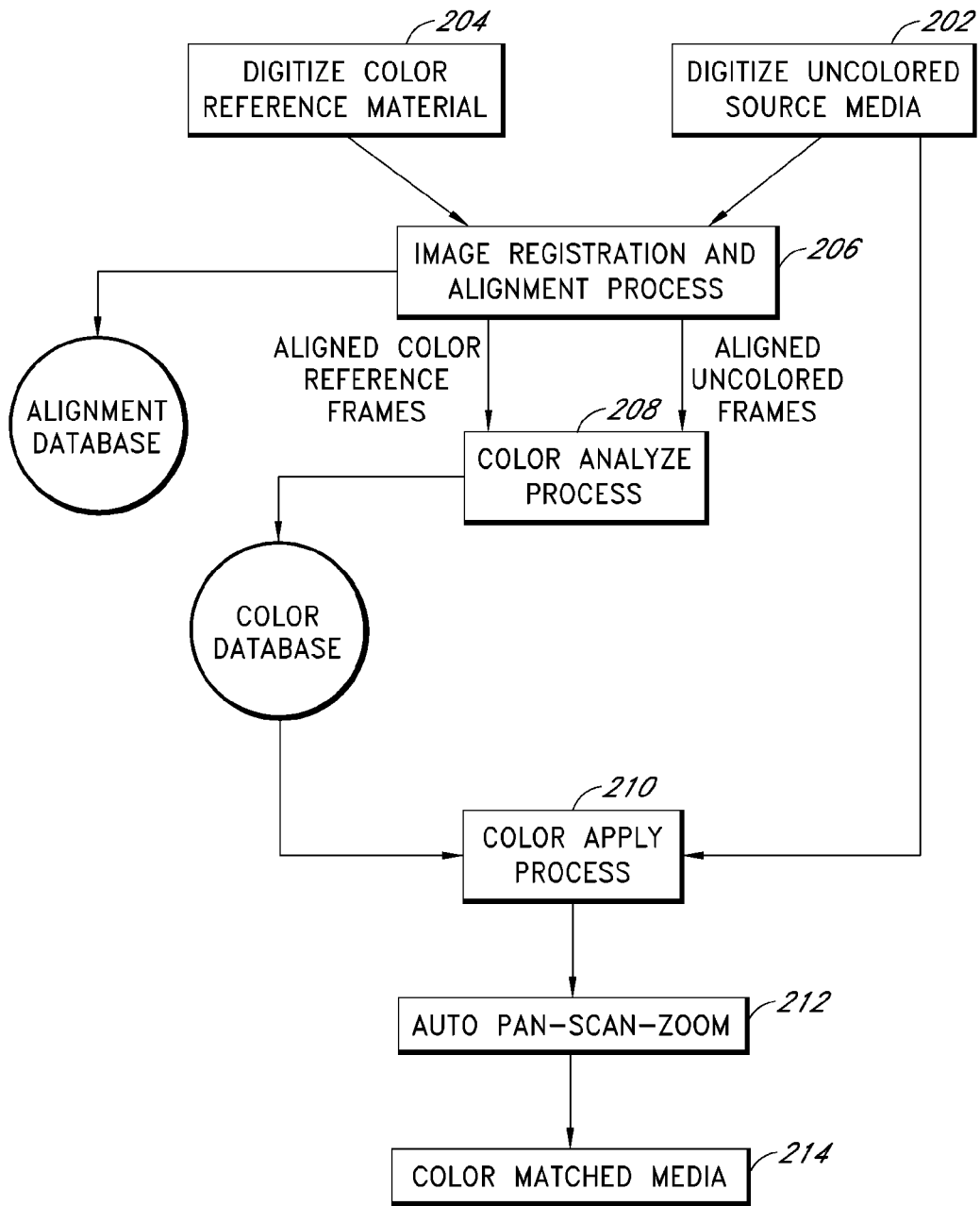
FIG. 2 illustrates an example processes for coloring source media using coloring information from a reference media.

FIG. 2 illustrates an example coloring process. The process may optionally be executed using the system illustrated in FIG. 1. Some or all of the process states may be performed in an automated manner using the system. Not all the states need be reached, the states may be performed in a different order, and, other embodiments, there may be more or fewer states than those illustrated.

At state 202, a source media (which may be in the default color state) that is to be colored and/or color corrected is received at a digitizer (e.g., digitizer 102) and is digitized. This state may be skipped if the source media is already in digital format. At state 204, a reference media (which may be a legacy media that already has the desired coloring but which may be at a lower resolution), whose color information is to be used in determining how to color the source media, is received at a digitizer (e.g., digitizer 102) and is digitized. This state may be skipped if the reference media is already in digital format. By way of example and not limitation, the reference media may be in 720×486 pixels format or 720×576 pixels format, and the source media may be at a higher resolution, such as is in 1280×720 pixels format or 1920×1080 pixels format.

Optionally, the media (e.g., the source media) undergoes a restoration process to correct flaws, color degradation, cracks, blots, etc.

In certain instances, the source media and the reference media may not be perfectly or sufficiently aligned/registered. For example, the source media and reference media may include one or more frames/images that differ relative to each other in panning, scanning, and/or zooming. Therefore, at state 206, an image registration and alignment process is performed.

Optionally, geometric distortions are separately removed or reduced in images of the source media and the reference media. Then, the example image registration and alignment process aligns two or more images (or portions thereof) of the same scene from the reference media and the source media, and outputs aligned color reference images/frames and aligned default colored images/frames. For example, the image alignment may be performed by performing a spatial transformation that maps locations in one image (e.g., from the reference media) to locations in another image (e.g., from the source media) so that the images from the two sources are better aligned. By way of illustration, point mapping can be used, where control points in the two images are selected (e.g., automatically and/or manually) to identify the same feature or landmark in the two images.

The example image registration and alignment process is optionally performed using several iterations, optionally utilizing different types of transformations, to obtain a satisfactory alignment. Optionally, gross global distortions may be initially removed in a first set of passes, followed by additional passes to remove smaller local distortions. Different techniques may optionally be used for the gross and smaller distortion removal. Alignment information is stored in an alignment data store (e.g., a database). For example, the alignment information may be in the form of a pixel-to-pixel or area-to-area spatial coordinate transformation map. The image registration and alignment process optionally identifies image areas (e.g., using image subtraction) in the reference media and the source media that may not overlap and or not sufficiently overlap. The areas that are not aligned or are not sufficiently aligned are optionally excluded from comparisons used in creating overall color correction.

Optionally, the image registration and alignment process determines which frames in the reference media are panned, scanned, and/or zoomed, stores a corresponding indication in memory in association with corresponding frame identifiers, and optionally stores information regarding the amount and location of the pan, can, and/or zoom.

At state 208, a color analysis process is performed (e.g., using the color analyzer 106). As similarly discussed above, the color analysis process may utilize one or more techniques, such as a lookup table technique and/or a color control adjustment technique. The color analysis process may generate scores for each of the techniques. The color analysis process stores coloring information in a color data store (e.g., a database).

At state 210, a color apply process is performed. The color apply process accesses the coloring information from the color database, the alignment information from the alignment database, and colors the source media so that the color matches or sufficiently matches that of the reference media. For example, the color apply process may use the lookup table generated via the color analysis process, and/or the color correction "knob settings." Optionally, the color apply process may first apply the color correction formulas (which tends to result in relatively less discontinuities and quantization errors relative to the lookup table coloring process), and then apply the lookup table coloring process, which tends to be relatively more accurate.

At state 212, an automated pan-scan-zoom process receives the output of the color apply process, accesses the alignment database, and performs pan-scan-zoom. For example, the pan-scan-zoom process may apply the same or substantially the same pan-scan-zoom as found in the reference media to the source media. The process can be applied on all frames where the reference media has different pan-scan-zoom than the source media, or only on selected frames. At state 214, the color-matched source material is output and optionally stored (e.g., on magnetic or optical media).

Figure 3:
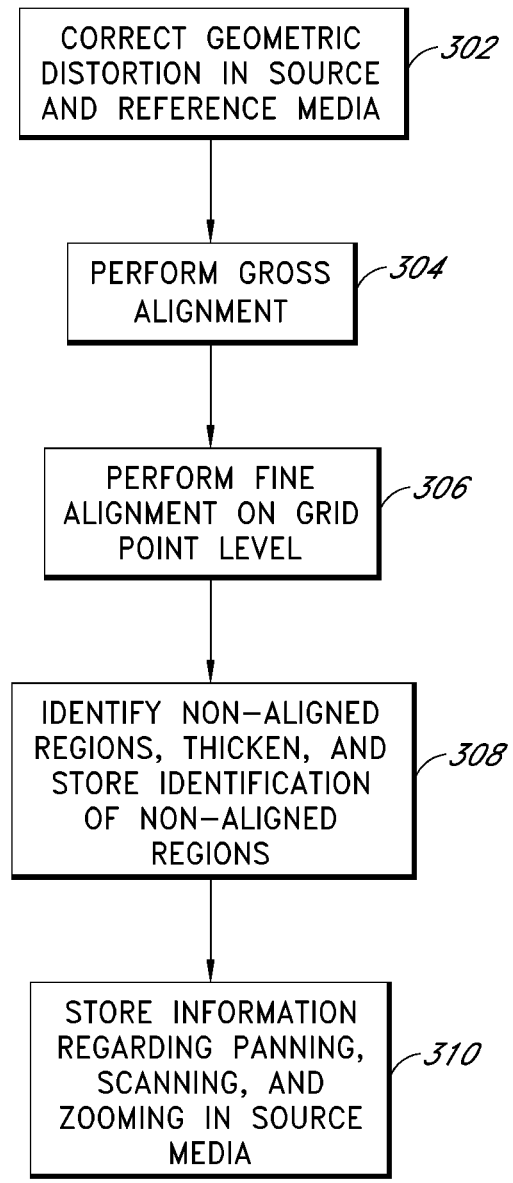
FIG. 3 illustrates an example embodiment of an image registration and alignment process.

FIG. 3 illustrates an example embodiment the image registration and alignment process of state 204 in greater detail. With respect to the illustrated process, optionally a user can specify a maximum alignment angle that the alignment process will attempt to correct for, maximum and minimum zoom limits, maximum permitted translation, and/or aspect ration correction limits. Further, optionally a user can specify a minimum confidence level, where if the confidence in correctness of the rotation with respect to alignment is less than the specified confidence level, the attempted alignment is not used. When warping is used, optionally the user can specify warping settings. For example, the operator can specify the warping grid dimensions (e.g., the number of row and columns) used to control the image warping. Optionally, the user can specify which grid points are to be locked, so that they are not moved during the alignment process.

At state 301, the pixel resolutions of the source and reference media are optionally reduced for use in an alignment and/or color matching process. For example, the reduction process may be performed in order to speed-up the subsequent processes and/or to reduce the computational load on the computing system. The reduction may be performed by averaging the color values and/or other values from 2 or more pixels to find a representative color value and replacing some or all of the pixels used in the averaging process for a given group of pixels with one pixel having the average value. This ensures that a given pixel used in the averaging process influences the resulting image having a reduced number of pixels. While the term "average" is being used, other techniques may be used to perform the pixel reductions (e.g., by using a median value). By way of further example, a pixel may be chosen to be representative of the color of surrounding pixels (e.g., the selected pixel may be in the center one in the grouping). The chosen pixel's color value may then be used in the reduced pixel count image in place of the group of pixels. In addition to or instead of the foregoing techniques, pixels may be simply deleted from the original image via a subsampling process.

At state 302, geometric correction is performed on the source media or the reference media, or both the source media and the reference media. For example, the geometric correction process may correct pin, barrel, drift, and/or warp distortion using image warping or other pixel/image displacement techniques. At state 304, a gross alignment process is performed to grossly align images/frames in the source media with corresponding images/frames in the reference media. For example, gross alignment may be performed using x-y displacements and/or zooming of an image or portions thereof. The displacement and/or zooming information is stored in memory. Optionally, at state 306, finer alignment may then be performed at each mesh grid point (or a subset thereof), and the alignment information is again stored in memory.

At state 308, images and/or frames of the now-substantially aligned source media are compared with image and/or frames of the source media to identify non-aligned regions. The identification of the non-aligned regions is stored in memory so that the non-aligned areas are not adversely used in performing the color analysis process. Optionally, the non-aligned areas that are to be excluded may be somewhat exaggerated or thickened to further ensure that information from the non-aligned areas are not inadvertently used in performing the color analysis.

At state 310, the identification of images/frames in the reference media that are panned, scanned, and/or zoomed are identified and corresponding information is stored in memory.

Figure 4:
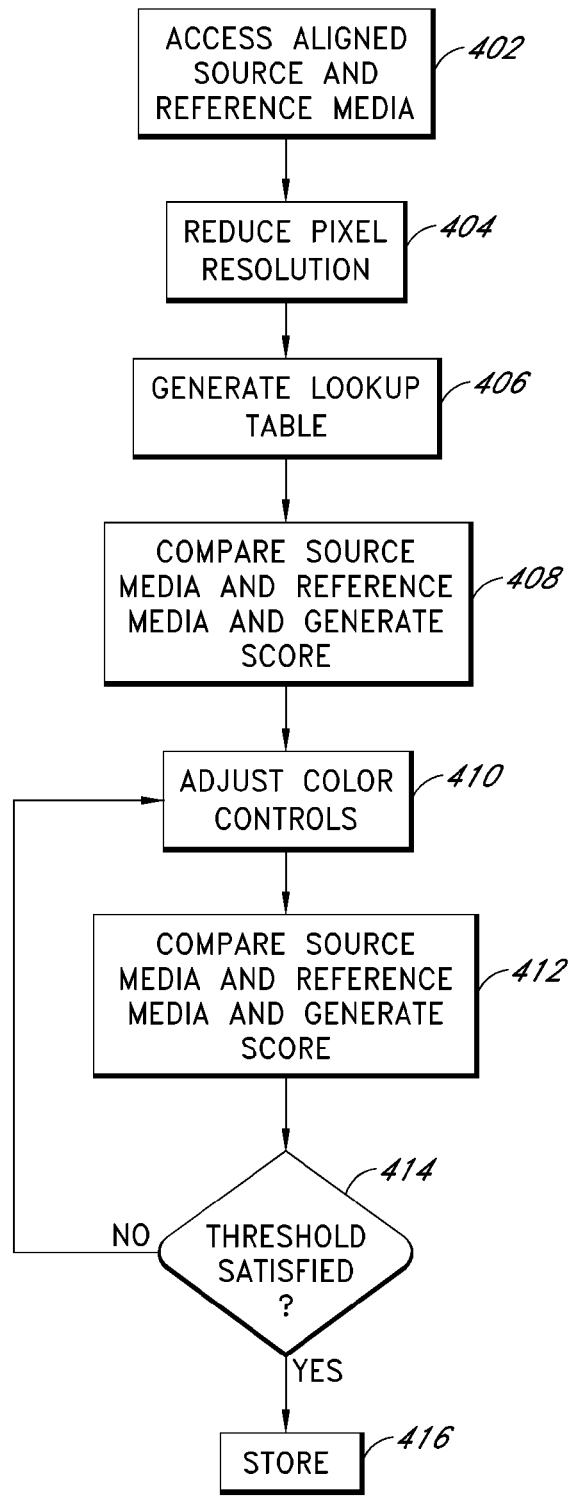
FIG. 4 illustrates an example embodiment of a color analyses process.

FIG. 4 illustrates an example color analysis process. At state 402, the aligned source media and reference media are read from memory.

At state 404, color adjustment controls (e.g., brightness, contrast, saturation, gamma, hue, tint, etc.) are set for a source image (e.g., to a neutral value). At state 406, a color score is generated by subtracting the source image, colored using the color control settings, from the corresponding reference image (or visa versa), and summing the number of non-black pixels. Optionally, the score takes into account how far from black a given pixel is. The score is stored in memory. At state 408, the score is compared to a threshold. If the score satisfies the threshold (e.g., is less than the threshold) or after a certain number of iterations, the process proceeds to state 410. Otherwise, the process proceeds back to state 404, and one or more controls are adjusted by a first amount. The process repeats until the threshold is satisfied and/or until a certain number of iterations have been performed and/or based at least in part on how quickly color convergence is being achieved. Optionally, with each iteration of the adjustment process, the adjustment controls are adjusted using finer/less adjustment then the previous adjustment. Thus, optionally the adjustments are initially performed in relatively large steps, and adjustments for the later iterations are performed in relatively small steps.

At state 410, an indication is stored in the color database as to which control setting had the best score, where in the indication is stored in association with the corresponding setting. At state 418, optionally the process selects and identifies the preferred/best coloring technique based at least in part of the matching score.

At state 412, a three dimensional color lookup table (LUT) is generated. Optionally, a separate LUT is generated for each frame. Optionally, temporal smoothing of color information is performed using a filter to avoid flickering or shimmer which may otherwise occur by having a separate LUT for each frame. By way of example, the smoothing may be performed by averaging (or otherwise statistically combining information from) pixel values over two or more frames. In an example embodiment, an input color for a given source pixel triplet defines a point inside the table. For example, the lookup table may be generated using equal step sampling along a given axis of the source space. Non-lattice points may be interpolated by using the nearest lattice points.

Figure 5:
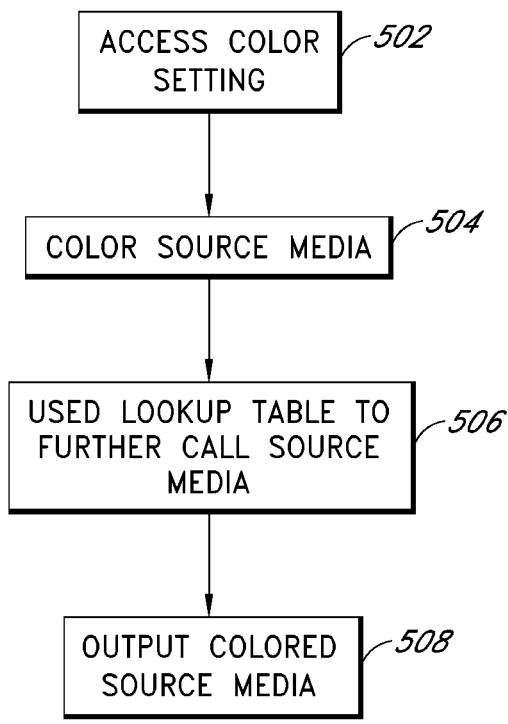
FIG. 5 illustrates an example embodiment of a color application process.

FIG. 5 illustrates an example color apply process. At state 502, the process accesses the color setting (for example, the coloring setting with the best score). At state 504, the process uses the color setting to color the source media so that the color matches or sufficiently matches that of the reference media. At state 506, the process further applies/corrects the source media color using the 3D lookup table accessed from the color database. At state 508, the process outputs the colored source media.

FIGS. 6A-B illustrate example user interfaces that provide controls to configure a system to perform processes described herein. Fewer, additional, or different user interface elements may be used as well.

Some of the following interfaces and functionality may optionally be implemented as plug-ins for an image composting software application, such as the publicly available Eyeon Fusion® image composting software, or may be implemented as a dedicated program. The user interfaces described herein permit an operator to enable or disable certain features, such as certain color control knobs (e.g., for adjusting color and/or hue). Further, the user interface enables a user to put limits on certain adjustments, such as the amount of zoom, maximum translation, minimum or maximum aspect ration correction, and the like. Still further, certain user interfaces enable to selectively lock grid points when performing alignments. Yet further, certain embodiments enable lookup tables to be specified. Various smoothing, interpolation, and RGB clipping parameters may be specified as well. Such interfaces will now be described with reference to the figures, FIG. 6A (including FIGS. 6A1 and 6A2) illustrates a user interface panel 602A via which a user can set image alignment parameters with respect to rotation, zooming, and aspect ration correction using slide controls and/or text entries. Alignment interfaces are provided via which a user can specify that rotation, scale, transition and/or aspect ratio correction are to be applied. Via a corresponding user interface, a user can specify a maximum alignment angle that the alignment process will attempt to correct for (e.g., a 90° offset in the illustrated example). The operator can also specify maximum and minimum zoom limits via the minimum and maximum scale controls, as well as maximum permitted translation. An interface is provided via which a user can specify that a previous frame's settings are to be utilized. An interface is provided (e.g., a slide control and/or numerical field) via which a user can specify a minimum and/or maximum aspect ratio (AR) correction. An interface is provided via which an operator can specify a minimum confidence level, where if the confidence in correctness of the rotation with respect to alignment is less than the specified confidence level (on a scale of 1 to 100 in this example), the attempted alignment is not used.

A field is provided via which the user can specify an autopan DBCN (database control number) database and an autopan output database. The operator can also browse to locate and identify an autopan database.

A warping panel 604A is provided via which an operator can specify warping settings. For example, the operator can specify the warping grid dimensions (e.g., the number of row, columns), wherein the warp grid is used to control the image warping. The warp grid will optionally be displayed over the image, and moving/dragging grid points (automatically by the system, or manually by an operator) causes the image to correspondingly to be warped. For example, frames from the source media and/or the reference media may undergo the warping process. In addition, the user interface enables an operator to specify which grid points are to be locked, so that they are not moved during the alignment process.

In addition, the user interface enables an operator to specify which grid points are to be unlocked and permitted to float, so that they may be moved during the alignment process. Optionally, the operator can specify that a given grid is to be used for a single frame, a plurality of specified frames, or all frames. An interface is provided via which an operator can specify a minimum confidence level, where if the confidence in the correctness of the warping with respect to alignment is less than the specified confidence level (on a scale of 1 to 100 in this example), the attempted alignment is not used. In addition, the operator can specify a maximum permitted translation (with respect to warping).

A flow panel 606A is provided via which a user can specify an image processing flow (e.g., by dragging and dropping and connecting components) and insert explanatory notes. For example, the user can specify the reference file and the source file, and the processes that are to be performed (e.g., image alignment, grid warping, LUT mapping, etc.), and the order in which the processes are to be performed.

Referring to FIG. 6B (including FIGS. 6B1 and 6B2), a panel 602B is provided via which an operator can specify lookup table (LUT) settings. In this example, LUT interfaces are provided via which a user can specify a LUT database (where the LUT to be loaded and used is accessed from), a LUT output database (which may be used to store temporal time averaging, where frames may be accessed before averaging, and/or may be used during the color application process), and via which the user can browse to locate and select a LUT database. In addition, interfaces are provided via which the user can specify a LUT dimension and a Gaussian insert (used in selecting a Gaussian for smoothing color variations in the image to reduce or eliminate color shear and discontinuities).

Interfaces 604B are provided via which a user can specify interpolation related items, such as:
(i) a color smoothing radius (e.g., used to perform color "blurring" or smoothing to average out or otherwise reduce high frequency distortions without unduly degrading the color matching, where the radius may correspond to the distance used for averaging within the three dimensional LUT),
(ii) the interpolate min-dist (minimum distance) multiplier for max_dist (maximum distance, used in performing interpolation for missing values in the LUT, the maximum distance between one of the interpolants and a center point (e.g., where there is a missing value in the LUT, interpolation may be used to fill in the missing value/detail),
(iii) interpolation with derivatives (which may be used to fill in areas (e.g., edges) of a LUT cube that are not filled in; for example, the color cube may include a field of vectors pointing to where color should go, and interpolation may be used to fill in the missing information with a mathematical average of vectors around the missing values),
(iv) the number of frames to average in performing time smoothing over color information (e.g., to reduce flickering, shimmer, etc.),
(v) the intensity multiplier for the moving average,
(vi) the maximum RGB vector length before clipping (used in determining when a vector length is such that the vector length is likely in error and should be clipped),
(vii) the maximum RGB vector length before removing (used in determining when a vector length is such that the vector length is likely in significant error and should be removed to eliminate bad data).

A scene list field is provided via which the operator can specify which frames are part of the same scene, to thereby indicate scene breaks. This is used to insure that frames from one scene are not used to color frames from another scene and so as not to average in coloring information from outside a given scene (which would likely cause erroneous coloring). A scene list browse interface which enables the operator to identify and select scenes.

Visualization interfaces 606B are provided via which the operator can obtain views of the LUT color cubes for diagnostic purposes.

Referring to FIG. 6C (including FIGS. 6C1 and 6C2), interfaces 602C enable the operator to specify what settings file is to be accessed and used, where the setting file includes mathematical "knob positions" for the color controls specified during the color analysis process.

Figure 6D:
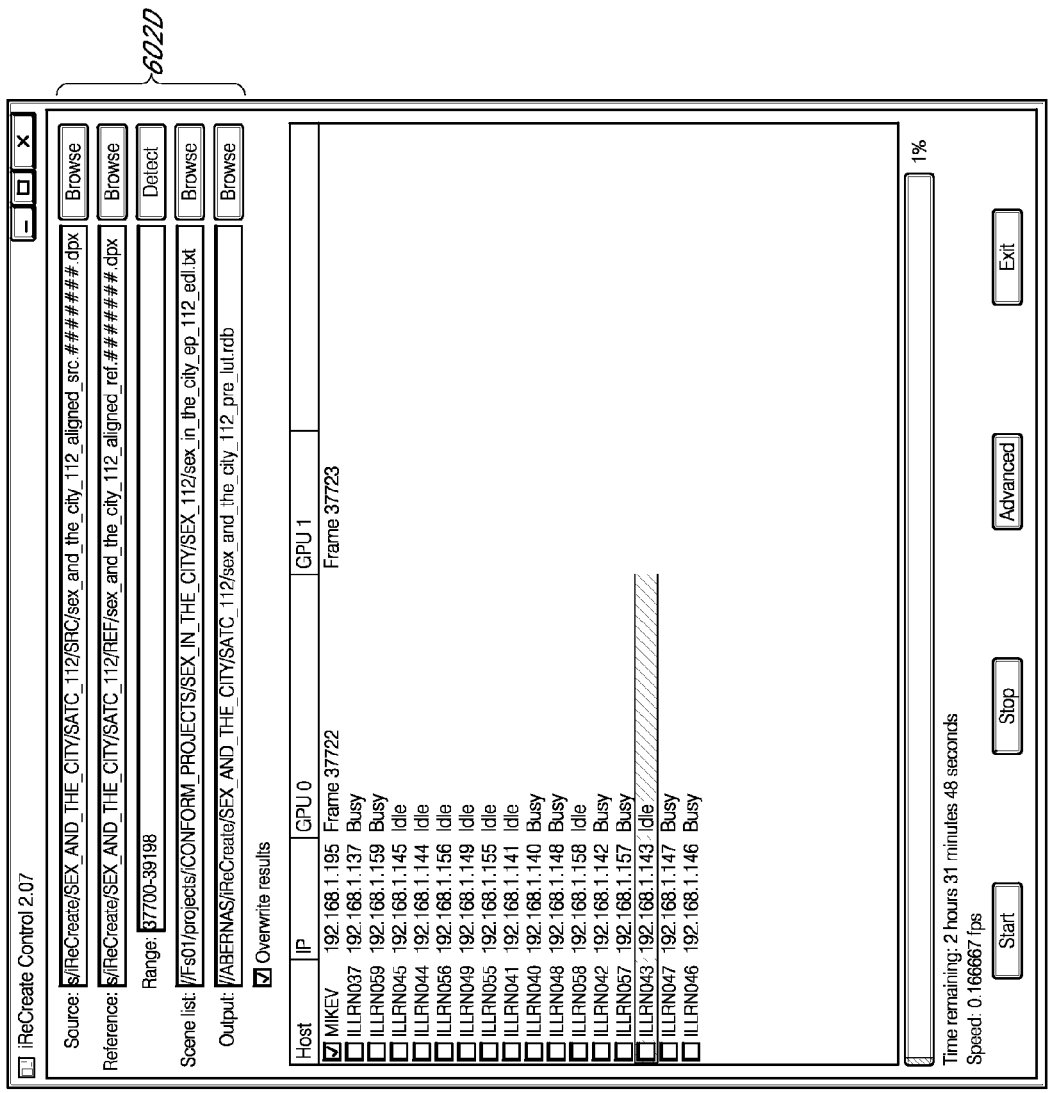

FIG. 6D provides interfaces 602D via which the operator can specify the name/location of the aligned source images and reference image, and the range of frames to use in performing the coloring process.

Figure 6E:
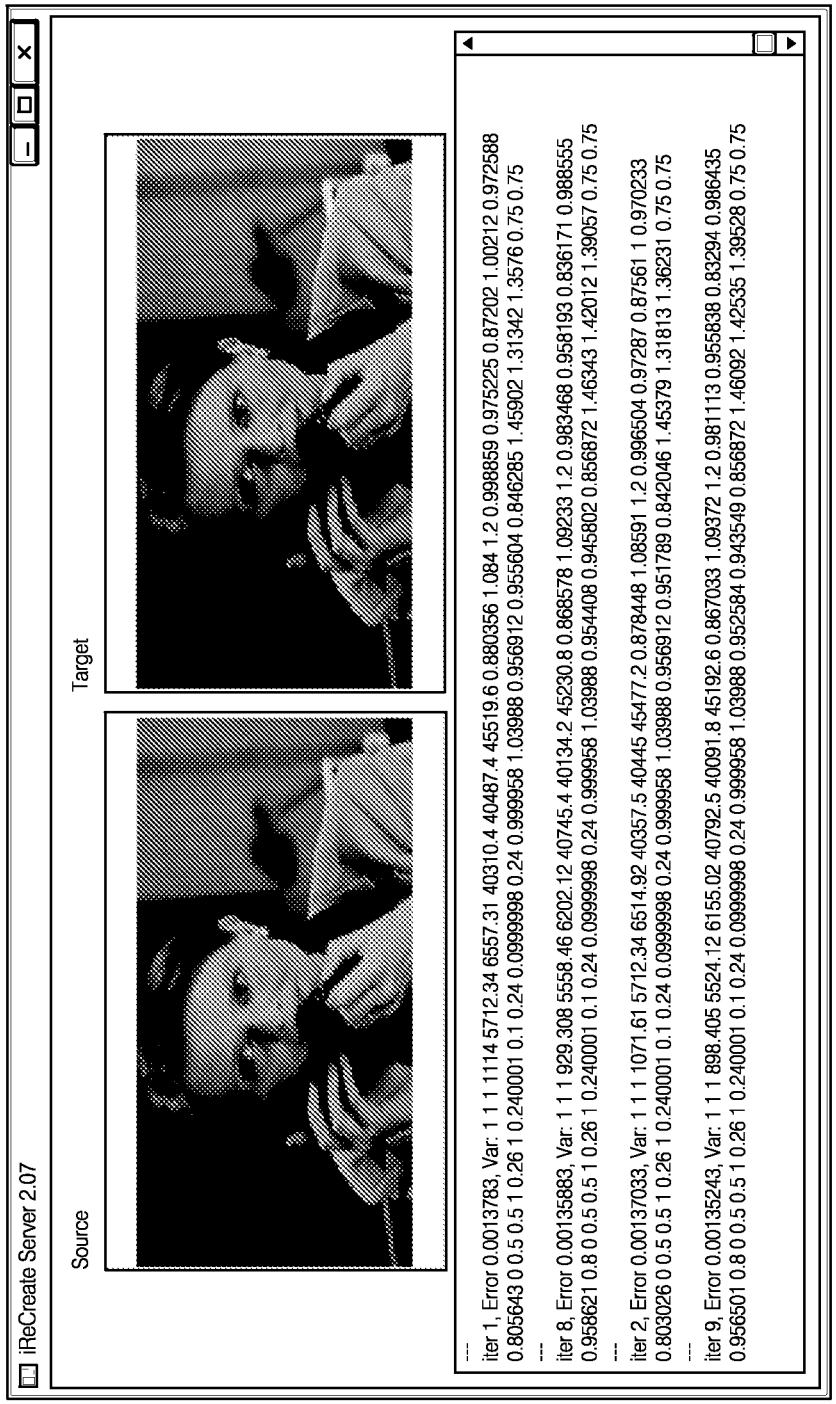
FIG. 6E illustrates a user interface displaying a source frame and a reference frame.

FIG. 6E illustrates a user interface displaying a reference (source) frame and a target frame being colored using the reference frame color information. This user interface enables an operator to review the performance of the color correction process.

Thus, described herein are various embodiments systems and methods for coloring source media utilizing coloring information from a reference media. The coloring process can be performed accurately and in an automated fashion. Further, certain embodiments can accommodate other differences between the source media and reference media, such as differences in panning, zooming, and/or cropping.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

What is claimed is:

1. An automated coloring system, comprising:
an input device configured to receive a digital version of a reference media, the reference media comprising a first sequence of images, and a digital version of a source media, the second media comprising a second sequence of images,
wherein the received source media is not derived from the reference media,
wherein the reference media is not derived from the source media, and
wherein the source media has a higher resolution than the reference media;
a registration device, including a processor, configured to align a plurality of images included in the source media with one or more corresponding images in the reference media;
a difference detector configured to detect and identify an alignment error with respect to an area in at least one reference media image;
a color analyzer configured to generate coloring information for the source media based at least in part on color information of the reference media;
a color applier that utilizes information from the color analyzer to color one or more images of the source media; and
a data store that stores a version of the second media including color information from the color applier.

2. The system as defined in claim 1, wherein the digital version of the source media is not color matched when received by the input device.

3. The system as defined in claim 1, wherein the first sequence of images has the same number of sequenced images as the second sequence of images.

4. The system as defined in claim 1, wherein the first sequence of images has different number of sequenced images then the second sequence of images.

5. The system as defined in claim 1, wherein the registration device is configured to align utilizing image mesh warping.

6. The system as defined in claim 1, wherein the registration device is configured to align utilizing spatial image displacement.

7. A method of coloring an image sequence, the method comprising:
   receiving at an apparatus including a computing device:
      a first sequence of images at a first resolution,
         wherein the first sequence of images includes images with color information;
      a second sequence of images;
   performing image registration for a plurality of images in the first sequence with respect to the second sequence and/or for a plurality of images in the second sequence with respect to the first sequence;
   identifying at least a portion of one image in the second sequence that is not registered with respect to at least one image in the first sequence;
   performing a color analysis using aligned images from the first sequence of images and the second sequence of images,
   wherein the at least portion of one image in the second sequence that is not registered with respect to at least one image in the first sequence is not used in performing the color analysis; and
   using results of the color analysis to color the second sequence of images, wherein the second sequence of images is colored to have substantially the same coloring as the first sequence of images.

8. The method as defined in claim 7, wherein at least one image in the second sequence of images is differently zoomed, panned, and/or cropped than a corresponding at least one image in the first sequence of images.

9. The method as defined in claim 7, wherein performing image registration, further comprises performing image mesh warping with respect to corresponding images in the first sequence and the second sequence.

10. The method as defined in claim 7, wherein performing image registration, further comprises performing spatial image displacement.

11. The method as defined in claim 7, wherein performing color analysis is performed using a pixel to pixel comparison with respect to at least a portion of one image in the first sequence of images and a corresponding portion of at least one image in the second sequence of images.

12. The method as defined in claim 7, wherein performing color analysis is performed using at least a first analysis method to provide a first analysis result and a second analysis method to provide a second analysis result, and a selector that provides the closet overall match from a set include the first analysis result and the second analysis result.

13. The method as defined in claim 7, wherein performing color analysis further comprises inserting pixel color values from aligned images in the first sequence and the second sequence into a data structure to indicate where a corresponding RGB color triple needs to be changed to achieve a desired color.

14. The method as defined in claim 7, the method further comprising panning, scanning, and/or zooming one or more images in the second media.

15. The method as defined in claim 7, wherein performing color analysis further comprises:
   iteratively adjusting a color of a given pixel in the second sequence and scoring a resulting color accuracy with respect to a corresponding pixel in the first sequence of images, and
   using the score to select a color adjustment from the iterative color adjustments.

16. The method as defined in claim 7, wherein performing color analysis further comprises:
   iteratively adjusting a color of a given pixel in the second sequence and scoring a resulting color accuracy with respect to a corresponding pixel in the first sequence of images, and
   using the score to select a color adjustment from the iterative color adjustments,
   wherein a last adjustment is smaller than at least one earlier adjustment.

17. The method as defined in claim 7, wherein the reference media is in 720×486 pixels format or 720×576 pixels format, and the source media is in 1280×720 pixels format or 1920×1080 pixels format.

18. A system, including at least one computing device, configured to perform operations comprising:
   receiving:
      a first sequence of images at a first resolution,
         wherein the first sequence of images includes images with color information;
      a second sequence of images;
   performing image registration for a plurality of images in the first sequence with respect to the second sequence and/or for a plurality of images in the second sequence with respect to the first sequence;
   identifying at least a portion of one image in the second sequence that is not registered with respect to at least one image in the first sequence;
   performing a color analysis using aligned images from the first sequence of images and the second sequence of images,
   wherein the at least portion of one image in the second sequence that is not registered with respect to at least one image in the first sequence is not used in performing the color analysis; and
   using results of the color analysis to color the second sequence of images, wherein the second sequence of images is colored to have substantially the same coloring as the first sequence of images.

19. A method of coloring an image sequence, the method comprising:
   receiving at an apparatus including a computing device:
      a first sequence of images at a first resolution,
         wherein the first sequence of images includes images with color information;
      a second sequence of images;
   performing image registration for a plurality of images in the first sequence with respect to the second sequence and/or for a plurality of images in the second sequence with respect to the first sequence;
   performing a color analysis using aligned images from the first sequence of images and the second sequence of images; and
   using results of the color analysis to color the second sequence of images, wherein the second sequence of images is colored to have substantially the same coloring as the first sequence of images.

20. The method as defined in claim 19, wherein at least one image in the second sequence of images is differently zoomed, panned, and/or cropped than a corresponding at least one image in the first sequence of images.

21. The method as defined in claim 19, wherein performing image registration, further comprises performing image mesh warping with respect to corresponding images in the first sequence and the second sequence.

22. The method as defined in claim 19, wherein performing image registration, further comprises performing spatial image displacement.

23. The method as defined in claim 19, wherein performing color analysis is performed using a pixel to pixel comparison with respect to at least one image in the first sequence of images and a corresponding at least one image in the second sequence of images.

24. The method as defined in claim 19, wherein performing color analysis is performed using at least a first analysis method to provide a first analysis result and a second analysis method to provide a second analysis result, and a selector from a result that provides the closet overall match from a set include the first analysis result and the second analysis result.

25. The method as defined in claim 19, wherein performing color analysis further comprises inserting pixel color values from aligned images in the first sequence and the second sequence into a data structure to indicate where a corresponding RGB color triple needs to be changed to achieve a desired color.

26. The method as defined in claim 19, the method further comprising panning, scanning, and/or zooming one or more images in the second media.

27. The method as defined in claim 19, wherein performing color analysis further comprises:
    iteratively adjusting a color of a given pixel in the second sequence and scoring a resulting color accuracy with respect to a corresponding pixel in the first sequence of images; and
    using the score to select a color adjustment from the iterative color adjustments.

28. The method as defined in claim 19, wherein performing color analysis further comprises:
    iteratively adjusting a color of a given frame in the second sequence and scoring a resulting color accuracy with respect to a frame in the first sequence of images, and
    using the score to select a color adjustment from the iterative color adjustments,
    wherein a last adjustment is smaller than at least one earlier adjustment.

29. The method as defined in claim 19, wherein the reference media is in 720×486 pixels format or 720×576 pixels format, and the source media is in 1280×720 pixels format or 1920×1080 pixels format.

30. A system, including at least one computing device, configured to perform operations comprising:
    receiving:
      a first sequence of images at a first resolution,
        wherein the first sequence of images includes images with color information;
      a second sequence of images;
    performing image registration for a plurality of images in the first sequence with respect to the second sequence and/or for a plurality of images in the second sequence with respect to the first sequence;
    performing a color analysis using aligned images from the first sequence of images and the second sequence of images; and
    using results of the color analysis to color the second sequence of images, wherein the second sequence of images is colored to have substantially the same coloring as the first sequence of images.

* * * * *

UNITED STATES PATENT AND TRADEMARK OFFICE
CERTIFICATE OF CORRECTION

PATENT NO. : 8,467,629 B2  
APPLICATION NO. : 13/206427  
DATED : June 18, 2013  
INVENTOR(S) : Dittert et al.

Page 1 of 1

It is certified that error appears in the above-identified patent and that said Letters Patent is hereby corrected as shown below:

In the Specification

In column 7 line 4, Change "and or" to --and/or--.

In column 7 line 6, Change "then" to --than--.

In column 7 line 12, Change "visa" to --vice--.

In column 11 line 37, Change "and or" to --and/or--.

In column 13 line 19, Change "visa" to --vice--.

In column 14 line 17 (approx.), Change "figures," to --figures.--.

In column 15 line 8, Change "6B 1" to --6B1--.

In column 15 line 30, Change "min-dist" to --min_dist--.

In the Claims

In column 16 line 64, In Claim 4, change "then" to --than--.

Signed and Sealed this  
Twenty-ninth Day of October, 2013

Teresa Stanek Rea  
*Deputy Director of the United States Patent and Trademark Office*